United States Patent
Abboud et al.

(10) Patent No.: US 9,139,189 B2
(45) Date of Patent: Sep. 22, 2015

(54) SCALABLE HYDRAULIC CHARGING IN A VEHICLE HAVING ENGINE AUTOSTOP/START FUNCTIONALITY

(75) Inventors: Amin Abboud, Livonia, MI (US); Crystal Nassouri, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 409 days.

(21) Appl. No.: 13/589,217

(22) Filed: Aug. 20, 2012

(65) Prior Publication Data
US 2014/0052334 A1    Feb. 20, 2014

(51) Int. Cl.
| | |
|---|---|
| B60W 10/06 | (2006.01) |
| B60W 10/30 | (2006.01) |
| B60W 10/24 | (2006.01) |
| B60K 6/12 | (2006.01) |
| F02D 29/04 | (2006.01) |
| F02N 11/08 | (2006.01) |
| B60W 30/18 | (2012.01) |

(52) U.S. Cl.
CPC .................. *B60W 10/06* (2013.01); *B60K 6/12* (2013.01); *B60W 10/24* (2013.01); *B60W 10/30* (2013.01); *B60W 30/18018* (2013.01); *F02D 29/04* (2013.01); *F02N 11/084* (2013.01); *B60W 2520/105* (2013.01); *B60W 2710/1083* (2013.01); *B60W 2720/10* (2013.01); *B60W 2720/106* (2013.01); *F02N 2200/0801* (2013.01); *Y02T 10/48* (2013.01); *Y02T 10/6208* (2013.01)

(58) Field of Classification Search
CPC ........................... Y02T 10/6208; Y02T 10/48
USPC ..................................................... 701/112, 113
See application file for complete search history.

(56) References Cited

U.S. PATENT DOCUMENTS

| | | | |
|---|---|---|---|
| 2004/0063533 A1* | 4/2004 | Silveri et al. .................. | 475/116 |
| 2008/0009987 A1* | 1/2008 | Williams et al. ................ | 701/31 |
| 2013/0116898 A1* | 5/2013 | Lundberg et al. ............... | 701/54 |

* cited by examiner

*Primary Examiner* — Fadey Jabr
*Assistant Examiner* — Basil T Jos
(74) *Attorney, Agent, or Firm* — Quinn Law Group, PLLC

(57) ABSTRACT

A method for hydraulically charging a fluid circuit in a vehicle includes calculating a fluid volume of the fluid circuit via a controller, and comparing a speed of the vehicle to a calibrated speed threshold. The method also includes calculating a vehicle deceleration rate when the speed of the vehicle is less than the calibrated speed threshold and the fluid volume is less than a calibrated volume threshold. The fluid circuit is then hydraulically charged to a target volume, using a fluid pump, at a hydraulic charging rate that corresponds to the calculated vehicle deceleration rate. A vehicle includes an engine, transmission having a fluid circuit with a fluid pump, and a controller. The controller executes instructions to charge the fluid circuit according to the method noted above. A system includes the transmission and controller.

20 Claims, 2 Drawing Sheets

SCALABLE HYDRAULIC CHARGING IN A VEHICLE HAVING ENGINE AUTOSTOP/START FUNCTIONALITY

TECHNICAL FIELD

The present disclosure relates to scalable hydraulic charging in a vehicle having engine autostop/start functionality

BACKGROUND

Conventional vehicles use an internal combustion engine to generate input torque, which is ultimately delivered to various gear sets and clutches of a transmission. In order to reduce idle fuel consumption, some engine-driven vehicles are configured with a powertrain that provides engine autostop/start functionality. In such a design, a controller is used to automatically shut off the engine during extended idling periods, for instance when the vehicle waits at a traffic light or in heavy traffic.

To restart the engine after an engine autostop event, an auxiliary starter motor may be used to crank the engine and initiate resumption of the fuel combustion process. However, hydraulic energy is needed during engine restart and subsequent vehicle launch. Therefore, an auxiliary fluid pump may be used to pre-charge a fluid circuit and thereby provide standby fluid pressure at a level needed for actuating the various hydraulic clutches of the transmission upon engine restart.

SUMMARY

A method and a system are disclosed herein for hydraulically charging a fluid circuit in a vehicle having an engine with autostop/start functionality. An auxiliary pump and/or a hydraulic accumulator of the fluid circuit are provided with a calibrated level of hydraulic charge prior to executing an autostop event. That is, sufficient hydraulic charging occurs prior to executing the autostop event to provide the required oil pressure for subsequent vehicle launch. In the present scalable approach, during a pre-autostop state, i.e., a state wherein vehicle speed decreases below a calibrated threshold, a deceleration rate of the vehicle is determined via a controller. The deceleration rate is then used to estimate an oil volume charging rate relative to a current oil volume level in the fluid circuit. The charging rate is thus scalable to account for the changing deceleration rate.

For a faster rate of vehicle deceleration, or for fast/frequent downshifts of a relatively short duration, oil consumption occurs at a relatively high rate. The controller in this instance schedules a short/aggressive oil fill rate. However, a slower oil fill rate will be scheduled during a period of relatively slow vehicle deceleration when less aggressive or shorter duration shifting takes place. In extreme cases, no fill is scheduled. The oil charging optimization logic of the controller, which is stored in a tangible, non-transitory memory device of the controller and executed by a processor in response to changing vehicle conditions, is based on classical closed-loop proportional-integral (PI) control theory. A target oil volume is used as a reference signal and an actual oil volume level is generated as an output.

In particular, a method is disclosed herein for hydraulically charging a fluid circuit in a vehicle having an engine with autostop/start functionality. The method includes calculating a fluid volume of the fluid circuit, and then comparing a speed of the vehicle to a calibrated speed threshold. Additionally, the method includes calculating a vehicle deceleration rate, via a controller, when the speed is less than the speed threshold and the fluid volume is less than a calibrated volume threshold. The fluid circuit is then hydraulically charged to a target volume, via a fluid pump, prior to shutting off the engine. Charging occurs at a hydraulic charging rate that corresponds to the calculated vehicle deceleration rate.

A vehicle is also disclosed that includes an engine, a transmission, and a controller in communication with both components. The transmission, which is connected to the engine, includes a fluid circuit having a fluid pump. The controller has a processor and a tangible, non-transitory memory device. The memory device stores instructions for hydraulically charging the fluid circuit in response to an engine pre-autostop state. Execution of the instructions by the processor causes the controller to execute the above method.

A system includes the transmission and controller as described above.

The above features and advantages and other features and advantages of the present invention are readily apparent from the following detailed description of the best modes for carrying out the invention when taken in connection with the accompanying drawings.

DETAILED DESCRIPTION

Figure 1:
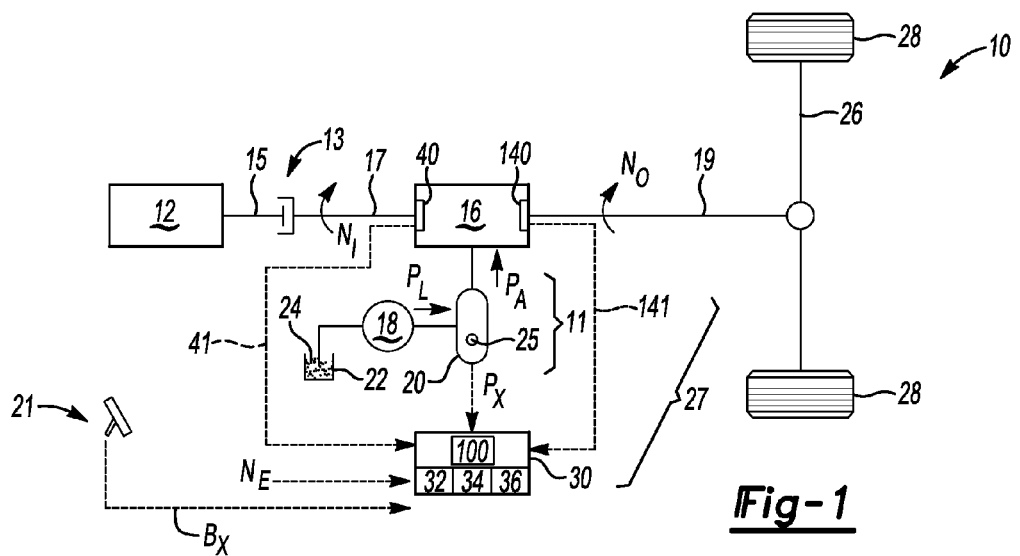
FIG. 1 is a schematic illustration of an example vehicle having an engine stop/start powertrain and a controller that optimizes energy consumption during hydraulic charging preparatory to and during engine shutdown.

Referring to the drawings, an example vehicle 10 is shown in FIG. 1 that includes an internal combustion engine 12 having automatic stop/start functionality. The vehicle also includes a controller 30 and an automatic transmission 16 having a hydraulic fluid circuit 11. The controller 30, which with the transmission 16 forms a system 27, includes a processor 32, a tangible, non-transitory memory device(s) 34, and a pump control module 36 as described below with reference to FIG. 2, selectively executes instructions embodying the present method 100. An example of this method 100 is described below with reference to FIG. 4. Execution of the method 100 enables the controller 30 to optimize energy consumption during hydraulic charging of the fluid circuit 11 preparatory to and during an automatic stop (autostop) of the engine 12, e.g., while the vehicle 10 idles in traffic or at a stop light.

An engine drive shaft 15 rotates at engine speed ($N_E$) and delivers engine torque to an input member 17 of the transmission 16. The input member 17 thus rotates at an input speed (arrow $N_I$). Output torque from the transmission 16 is transferred to an output member 19, which rotates at an output speed ($N_O$), and ultimately to a drive axle 26 and a set of connected drive wheels 28. Optionally, an input clutch 13 may be selectively actuated to connect or disconnect the engine 12 to or from the driveline of the vehicle 10 as needed, such as to minimize driveline vibration during restart.

With respect to the fluid circuit 11 of FIG. 1, fluid 24 is drawn from a sump 22 by an auxiliary fluid pump 18. The fluid pump 18 circulates the fluid 24 through the fluid circuit 11 at line pressure (arrow $P_L$) to a set of clutches and associated valves or other fluid control equipment of the transmission 16. Optionally, a hydraulic accumulator 20 may be used in the fluid circuit 11. The accumulator 20 may include a pressure sensor 25 therein, and may be charged with fluid 24 to provide a ready supply of hydraulic pressure to the transmission 16 upon restart of the engine 12 after an engine autostop event.

The controller 30 shown in FIG. 1 selectively executes the present method 100, via the processor 32 coupled to the memory device 34, for instance by executing computer code or instructions recorded in the memory device 34. The memory device 34 may include read only memory (ROM), electrically-programmable read-only memory (EPROM), optical media, magnetic media other than ROM, flash memory, etc. The controller 30 may also include sufficient transitory memory, e.g., random access memory (RAM) and the like. Additionally, the memory device 34 may include any software elements/programming code of the pump control module 36 noted above, as well as one or more high-speed digital timers, analog-to-digital (A/D) circuitry, digital-to-analog (D/A) circuitry, digital signal processing devices, and all necessary input/output (I/O) devices and/or other signal conditioning and/or buffer circuitry.

As is well understood in the art, proportional-integral (PI) control refers to a specific closed-loop feedback approach and associated logic using two control terms: a proportion (P) term and an integral (I) term. The terms represent the respective past and present error values of a particular variable being controlled, in this instance the fill rate of an element of the fluid circuit 11. Gain values are associated with each control term.

A typical PI-based control approach generates a feed-forward control term (U) into a plant or system being controlled, e.g., the transmission 16 of FIG. 1. The U term may be calculated using the following equation:

$$U = K_P \Delta + K_I \int \Delta dt$$

where $\Delta$ is the deviation between a target value and an actual value, and $K_P$ and $K_I$ represent the respective calibrated proportional and integral gains. A PID control approach using an additional term, i.e., the derivative (D) term, to account for predicted error may also be used herein without departing from the intended inventive scope.

Various control values are determined by the controller 30 in the execution of the present method 100, including a braking request (arrow $B_X$) from a brake pedal 21, engine speed (arrow $N_E$), e.g., from an engine control unit (not shown) or speed sensor, transmission input speed (arrow 41) from a transmission input speed sensor (TISS) 40, and transmission output speed (arrow 141) from a transmission output speed sensor (TOSS) 140. Additional control values determined by the controller 30 may include pressure within the accumulator 20, as read by the pressure sensor 25 positioned therein. Fluid 24 is delivered from the accumulator 20 at accumulator pressure (arrow $P_A$) to the transmission 16. An accumulator fluid volume, i.e., the amount of fluid in the accumulator 20, may be calculated by the controller 30 as a function of the measured pressure (arrow $P_X$), with the value $P_X$ equaling the line pressure (arrow $P_L$) when the accumulator 20 is not used and the accumulator pressure (arrow $P_A$) when the accumulator 20 is used.

Figure 2:
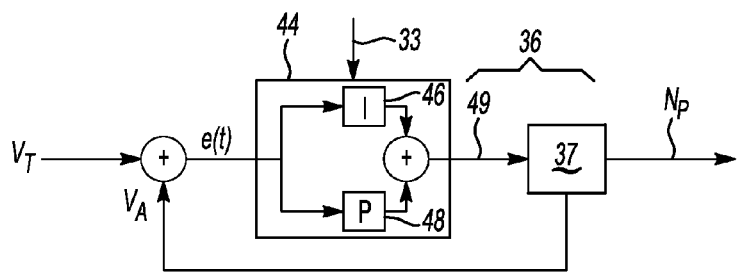
FIG. 2 is a schematic logic diagram describing a proportional-integral control module usable as part of the controller shown in FIG. 1.

Referring to FIG. 2, an example embodiment of the pump control module 36 noted above is shown in block diagram form. As is known in the art, PI control requires a target value. In the present approach, the target value is a target volume ($V_T$) of the fluid circuit 11 of FIG. 1, for instance a volume of the accumulator 20 in an embodiment in which the accumulator 20 is used. The target volume ($V_T$) is determined by the controller 30 of FIG. 1 using a calibrated maximum accumulator pressure, e.g., approximately 6500 kPa. The volume of the accumulator 20 may change over time as the accumulator 20 ages. The maximum pressure, however, should remain stable.

A deceleration rate signal (arrow 33) is communicated to a PI logic block 44 of the pump control module 36. The deceleration rate communicated via the deceleration rate signal (arrow 33) may be calculated by the controller 30 using the measured output speed (arrow 141) from the TOSS 140. The controller 30 may assign to or classify the deceleration rate into one of a plurality of different categories, for instance fast, medium, and slow. The PI logic block 44, which includes an integral (I) block 46 and a proportional (P) block 48, processes an error signal, e(t), and the deceleration rate signal (arrow 33) to generate an output signal (arrow 49). The output signal (arrow 49) is fed into a speed control block 37.

Describing each of these elements in turn, within the PI logic block 44, the integral block 46 is used to calculate the I term using the equation:

$$I = K_I \int_0^\tau e(t) dt$$

where $K_I$ is the integral gain and e(t) is the error term. The proportional block 48 is used to calculate the P term using the equation $P = K_P \cdot e(t)$, as is understood in the art. The error in the two outputs of the two blocks 46, 48 defines the value communicated via the output signal (arrow 49), which is fed into the speed control block 37 as noted above.

The speed control block 37 shown in FIG. 2 calculates a commanded speed ($N_P$) for the pump 18 of FIG. 1 as a function of the output signal (arrow 49). The following equation may be used:

$$N_P = N_B \cdot e[K_I e(t) + K_P \cdot e(t) dt]$$

where $N_P$ is the commanded pump speed and $N_B$ is a calibrated base pump speed, the latter of which may be determined as a function of the temperature of the fluid 24 and the actual accumulator pressure (arrow $P_A$). The pump 18 is thus commanded to operate at the commanded pump speed ($N_P$), while the actual volume ($V_A$) is also calculated and added to the target volume ($V_T$) to calculate the error term, e(t).

Figure 3:
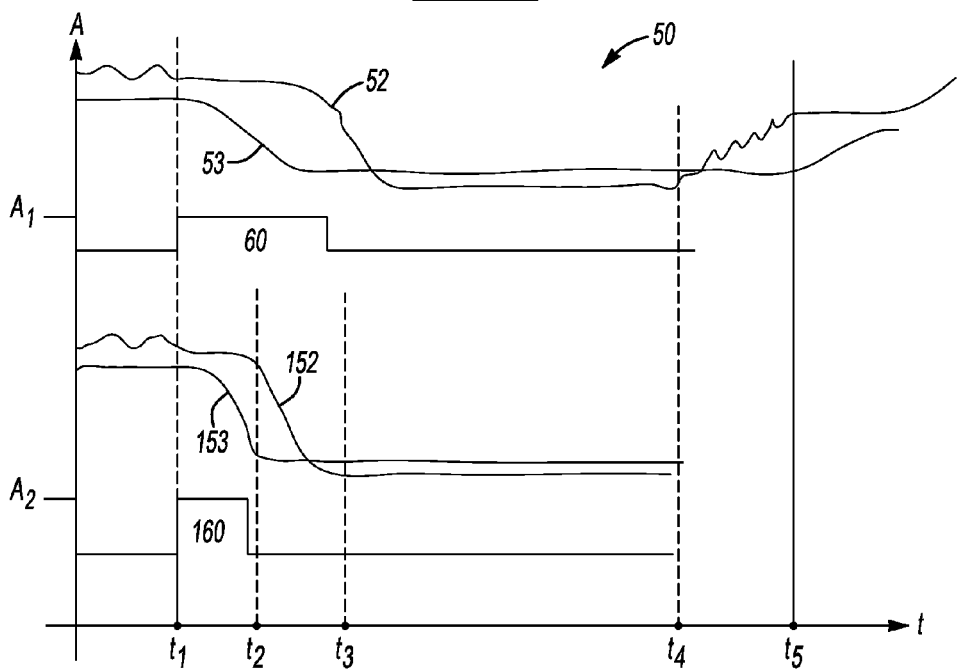
FIG. 3 is an example charging profile for the vehicle shown in FIG. 1.

Referring to FIG. 3, a set of traces 50 illustrates two example vehicle deceleration profiles as traces 52 and 152 having amplitude (A) plotted on the vertical axis and time (t) plotted on the horizontal axis, along with corresponding engine speed profiles 53 and 153. In a relatively gradual deceleration trace, i.e., trace 52, a hydraulic charging pulse 60 to the pump 18 of FIG. 1 may have a first amplitude ($A_1$) and a first duration ($t_1$ to about $t_3$).

A more aggressive deceleration trajectory is illustrated via trace 152, wherein a charging pulse 160 has an amplitude ($A_2$) greater than $A_1$ and of a shorter duration, i.e., stopping before $t_2$. Thus, the pump 18 of FIG. 1 will charge aggressively until a target oil volume is met, while for less aggressive decelerations such as that illustrated by trace 52, hydraulic charging may be conducted at a slower rate. The controller 30, using the logic shown in FIG. 2, determines appropriate PI gains $K_P$ and $K_I$ to apply to achieve a faster/slower charge rate.

Figure 4:
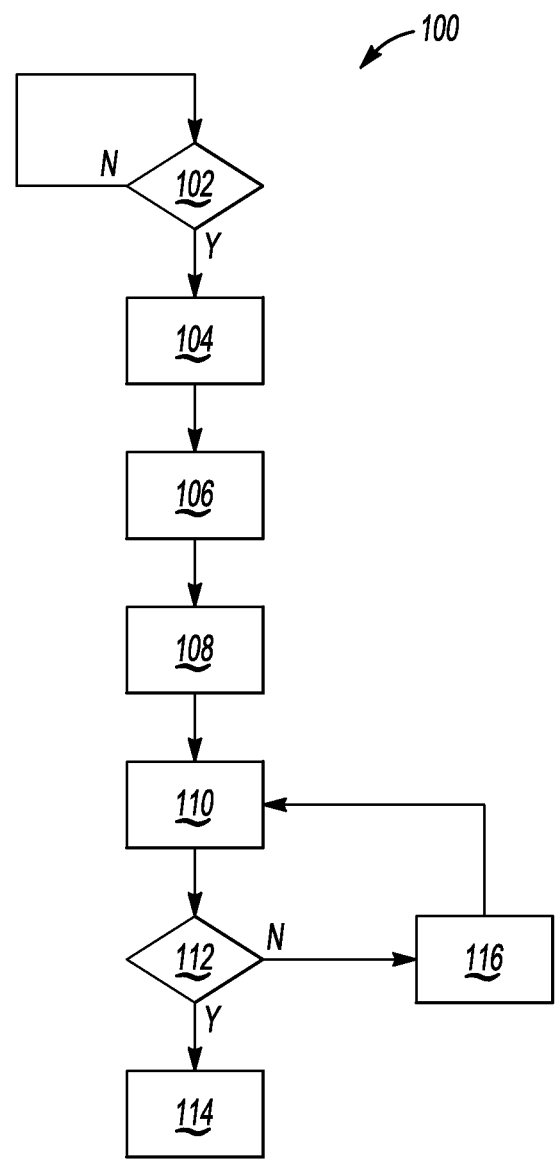
FIG. 4 is a flow chart describing a method for hydraulically charging a hydraulic circuit within the example vehicle shown in FIG. 1.

Referring to FIG. 4, an example embodiment of the present method 100 is described with reference to the structural elements shown in FIG. 1. Beginning at step 102, the controller 30 measures or otherwise determines the speed of the vehicle 10, such as by receiving and processing the transmission output speed signal (arrow 141) from the TOSS 140. The controller 30 then compares this speed to a low calibrated speed threshold, e.g., about 5 kilometers per hour in one embodiment. The method 100 proceeds to step 104 if the vehicle speed is less than this speed threshold. Otherwise, the controller 30 repeats step 102.

At step 104, the controller 30, having recognized at step 102 that the vehicle 10 is presently slowing and has entered a pre-autostop state, next determines the deceleration rate of the vehicle 10. Step 104 may entail calculating the time derivative of the value of the transmission output speed signal (arrow 141) from the TOSS 140. The method 100 proceeds to step 106 once the deceleration rate is known.

At step 106, the controller 30 assigns a category to the deceleration rate determined at step 104, e.g., relatively fast, moderate, or slow in comparison to the rates of the other categories. These categories, which may be more or fewer in number than the three example categories noted here, are calibration values which may be scaled as needed to provide the desired response. The method 100 proceeds to step 108 once an appropriate rate category has been assigned.

At step 108, the controller 30 may set a flag that, when set, commands the processor 32 to perform additional calculations in the following steps. A set flag at step 108 corresponds to a command to proceed with speed control of the pump 18 according to the remaining steps of the method 100. The method 100 proceeds to step 110 once the flag has been set.

At step 110, the controller 30 next calculates the actual volume of the accumulator 20, when used, or of the fluid circuit 11 downstream of the pump 18 when such a device is not used. Step 110 may entail measuring the accumulator pressure (arrow $P_A$) using the sensor 25 and then calculating the actual volume of fluid in the accumulator 20 as a function of the measured accumulator pressure. While the pressure may be kept constant, over time as the seals of the accumulator 20 degrade, the same pressure may correspond to a lesser volume of fluid. Step 110 ensures that the actual volume of fluid is known precisely prior to proceeding with the remaining steps.

At step 112, having determined the level of fluid in the accumulator 20 at step 110, the controller 30 next determines whether the volume exceeds a calibrated volume threshold. If so, the method 100 proceeds to step 114. However, if the volume determined at step 110 is lower than the calibrated volume threshold, the method 100 proceeds instead to step 116.

At step 114, the controller 30 executes the auto stop/start cycle in the usual manner, with the assurance that the volume of fluid in the accumulator 20 is sufficient to do so. The method 100 then returns to step 102.

At step 116, the controller 30, having determined at step 112 that the volume of fluid in the accumulator 20 is insufficient for executing an autostop/start cycle, automatically schedules a target fill rate in the manner set forth above. That is, the controller 30 selects a hydraulic charging rate of the accumulator 20, or of the fluid circuit 11 absent the accumulator 20, that corresponds to the category assigned at step 106. The traces 50 of FIG. 3 described above provide an example of a slower (trace 52) and faster (trace 152) deceleration rate. Once the charging rate has been determined, the method 100 controls the pump 18 as needed to achieve the required fill rate, either speeding up or slowing down the pump 18 as needed. While the fill is in progress, the method 100 proceeds to step 110.

While the best modes for carrying out the invention have been described in detail, those familiar with the art to which this invention relates will recognize various alternative designs and embodiments for practicing the invention within the scope of the appended claims.

What is claimed is:

1. A method for hydraulically charging a fluid circuit in a vehicle having an engine with autostop/start functionality, the method comprising:
   calculating, via a controller of the vehicle, an actual fluid volume of the fluid circuit;
   comparing a speed of the vehicle to a calibrated speed threshold;
   calculating a vehicle deceleration rate, via the controller, when the speed of the vehicle is less than the calibrated speed threshold and the actual fluid volume is less than a calibrated volume threshold; and
   using a fluid pump to hydraulically charge the fluid circuit to a target fluid volume, prior to shutting off the engine during an engine autostop event, at a scalable hydraulic charging rate, wherein the scalable hydraulic charging rate corresponds to the calculated vehicle deceleration rate.

2. The method of claim 1, the method further comprising:
   executing the engine autotstop event when the fluid circuit has been charged to the target fluid volume.

3. The method of claim 1, wherein the vehicle includes a pressure sensor positioned in the fluid circuit, and wherein calculating the actual fluid volume includes:
   measuring a fluid pressure within the fluid circuit; and
   calculating the actual fluid volume as a function of the measured fluid pressure.

4. The method of claim 3, wherein:
   the fluid circuit includes a hydraulic accumulator;
   the pressure sensor is positioned within the hydraulic accumulator; and
   calculating the actual fluid volume includes calculating an actual fluid volume of the accumulator.

5. The method of claim 1, further comprising:
   assigning a rate category to the calculated deceleration rate using the controller; and
   selecting a charging rate using the assigned rate category.

6. The method of claim 1, further comprising:
   calculating an error value between the target fluid volume and the actual fluid volume.

7. The method of claim 6, wherein calculating the error value includes adding proportional and integral error terms using proportional-integral control logic that is recorded in memory of the controller, further comprising:
   feeding the calculated error value into a speed controller block;
   calculating a commanded speed of the fluid pump using a processor and logic of the speed controller block; and
   transmitting the calculated commanded speed to the fluid pump.

8. A vehicle comprising:
   an engine having autostop/start functionality;
   a transmission connected to the engine, wherein the transmission includes a fluid circuit having a fluid pump; and
   a controller in communication with the engine and the transmission, and having a processor and a tangible, non-transitory memory device in communication with the processor, wherein the memory device stores instructions for hydraulically charging the fluid circuit via the fluid pump;

wherein execution of the instructions by the processor causes the controller to:

calculate an actual fluid volume of the fluid circuit using the processor;

compare a speed of the vehicle to a calibrated speed threshold;

calculate a vehicle deceleration rate when the speed is less than the calibrated speed threshold and the fluid volume is less than a calibrated volume threshold; and command the fluid pump to hydraulically charge the fluid circuit to a target volume, prior to executing an engine autostop event, at a scalable hydraulic charging rate that corresponds to the calculated vehicle deceleration rate.

9. The vehicle of claim 8, wherein the controller is configured execute the engine autostop event only when the actual fluid volume of the fluid circuit reaches a target fluid volume.

10. The vehicle of claim 8, further comprising a pressure sensor positioned in the fluid circuit, wherein the controller calculates the actual fluid volume by measuring a fluid pressure within the fluid circuit using the pressure sensor, and by calculating the actual fluid volume as a function of the measured fluid pressure.

11. The vehicle of claim 10, further comprising a hydraulic accumulator positioned within the fluid circuit in fluid communication with the fluid pump, wherein the pressure sensor is positioned within the hydraulic accumulator and is configured to measure pressure within the accumulator as the actual fluid pressure.

12. The vehicle of claim 8, wherein the controller is further configured to:

assign a rate category to the calculated deceleration rate; and select a charging rate using the assigned rate category.

13. The vehicle of claim 8, wherein the controller includes a proportional-integral (PI) control logic block recorded in the memory device, and wherein the controller calculates an error value between a target fluid volume and the actual fluid volume by executing the PI control logic block using the processor.

14. The vehicle of claim 13, wherein the controller includes a speed control block recorded in the memory device, and wherein the controller processes the calculated error value from the PI control logic block via the speed controller block, using the processor, and thereby calculates a commanded speed of the fluid pump and transmits the commanded speed to the fluid pump.

15. A system for use in a vehicle having an engine with stop/start functionality, the system comprising:

a transmission having a fluid circuit that includes a fluid pump, wherein the transmission is connectable to the engine; and a controller in communication with the transmission, and having a processor and a tangible, non-transitory memory device in communication with the processor, wherein the memory device stores instructions for hydraulically charging the fluid circuit;

wherein execution of the instructions by the processor causes the controller to:

calculate an actual fluid volume of the fluid circuit;

compare a speed of the vehicle to a calibrated speed threshold;

calculate a vehicle deceleration rate when the speed is less than the calibrated speed threshold and the fluid volume is less than a calibrated volume threshold; and command the fluid pump to hydraulically charge the fluid circuit to a target volume, prior to executing an engine autostop event, at a scalable hydraulic charging rate that corresponds to the calculated vehicle deceleration rate.

16. The system of claim 15, wherein the controller is configured to execute the engine autostop event only when the actual volume of the fluid circuit reaches a target fluid volume.

17. The system of claim 15, further comprising a pressure sensor positioned in the fluid circuit, wherein the controller calculates the fluid volume by measuring a fluid pressure within the fluid circuit using the pressure sensor, and calculates the actual fluid volume as a function of the measured fluid pressure.

18. The system of claim 15, further comprising a hydraulic accumulator within the fluid circuit, wherein the pressure sensor is positioned within the hydraulic accumulator.

19. The system of claim 15, wherein the controller is further configured to:

assign a rate category to the calculated deceleration rate; and select a charging rate using the assigned rate category.

20. The system of claim 15, wherein the controller includes a proportional-integral (PI) control logic block and a speed control block both recorded in the memory device, and wherein the controller is configured to:

calculate an error value between a target fluid volume and the actual fluid volume by executing logic from the PI control logic block using the processor;

process the calculated error value through the speed controller block using the processor;

calculate a commanded speed of the fluid pump using the calculated error value; and transmit the commanded speed to the fluid pump.

* * * * *